(12) United States Patent
Toskala et al.

(10) Patent No.: US 6,975,615 B1
(45) Date of Patent: Dec. 13, 2005

(54) DATA TRANSMISSION METHOD AND MOBILE TELEPHONE SYSTEM

(75) Inventors: Antti Toskala, Helsinki (FI); Zhi-Chun Honkasalo, Kauniainen (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/486,821

(22) PCT Filed: Jun. 30, 1999

(86) PCT No.: PCT/FI99/00581

§ 371 (c)(1),
(2), (4) Date: Mar. 2, 2000

(87) PCT Pub. No.: WO00/02326

PCT Pub. Date: Jan. 13, 2000

(30) Foreign Application Priority Data

Jul. 3, 1998 (FI) .................................. 981546

(51) Int. Cl.[7] ............................................. H04B 7/216
(52) U.S. Cl. ..................... 370/342; 370/335; 370/468
(58) Field of Search ................................ 370/342, 345, 370/347, 203, 208, 209, 216, 217, 229, 230, 235, 237, 277, 278, 310, 320, 321, 328, 329, 335, 336, 395.64, 395.65, 441, 465, 468; 375/130, 140, 134, 145

(56) References Cited

U.S. PATENT DOCUMENTS

| | | | |
|---|---|---|---|
| 5,533,013 A | | 7/1996 | Leppanen |
| 5,883,899 A | * | 3/1999 | Dahlman et al. ............ 370/468 |
| 5,920,552 A | * | 7/1999 | Allpress et al. ............ 370/335 |
| 6,009,091 A | * | 12/1999 | Stewart et al. ............ 370/342 |
| 6,041,034 A | * | 3/2000 | Fukumasa et al. ........... 370/203 |
| 6,108,369 A | * | 8/2000 | Ovesjo et al. ............ 375/146 |
| 6,130,884 A | * | 10/2000 | Sato ........................... 370/335 |
| 6,222,875 B1 | * | 4/2001 | Dahlman et al. ............ 375/130 |
| 6,317,413 B1 | * | 11/2001 | Honkasalo ................... 370/209 |
| 6,542,484 B1 | * | 4/2003 | Ovesjo et al. .............. 370/335 |
| 6,631,125 B1 | * | 10/2003 | Longoni et al. ............ 370/341 |

FOREIGN PATENT DOCUMENTS

| | | |
|---|---|---|
| EP | 600 713 | 6/1994 |
| EP | 944 275 | 9/1999 |
| EP | 954 118 | 11/1999 |
| JP | 06-350523 A | 12/1994 |
| JP | 10-75209 | 3/1998 |
| JP | 10-145282 | 5/1998 |
| JP | 10-150386 | 6/1998 |
| JP | 10-164009 | 6/1998 |
| WO | WO 97/01256 | 1/1997 |
| WO | WO 97/15985 | 5/1997 |

OTHER PUBLICATIONS

Ottosson, T. et al., "On schemes for multirate support in DS–CDMA systems," Wireless Personal Communications, pp. 256–285, (Mar. 1998).

(Continued)

Primary Examiner—Brian Nguyen
(74) Attorney, Agent, or Firm—Pillsbury Winthrop Shaw Pittman LLP (57) ABSTRACT

The invention relates to a method for transmitting data from a radio network subsystem to user equipment in a mobile telephone system, a radio network subsystem and user equipment. In the method, the radio network subsystem transmits a dedicated control channel to the user equipment and a dedicated traffic channel of variable data transmission rate to the user equipment. During transmission, the radio network subsystem spreads each channel with a spreading code, and the spreading code used to spread the traffic channel is changed according to the required data transmission rate. According to the invention, each control channel frame indicates the spreading code with which the corresponding traffic channel is spread when transmitted.

53 Claims, 9 Drawing Sheets

OTHER PUBLICATIONS

"The ETSI UMTS Terrestrial Radio Access (Utra) ITU–RTT Candidate. Submission," ETIS/SMG/SMG2, pp. 1–135, (Jun. 1998).

"ETSI UMTS Terrestrial Radio Access (Ultra) ITU–RTT Candidate Submission,"Tdoc SMG2 260/98, May/Jun., 1998.

W.G. McFarlane, "Notice of Opposition," In the matter of Australian Patent Application No. 757864 in the name of Nokia Corporation and Opposition thereto by Qualcomm Incorporated, pp. 1–13, (Jun. 5, 2003).

Johannes Heselberger, "Opposition against European Patent EP 1 012 995 B1 with the title 'Data Transmission Method and Mobile Telephone System' of Nokia Corporation," pp. 1–29, (Mar. 9, 2005).

Ken Felix et al., "3G MAC Layer Messages, Parameters and Procedures for High Speed Packet Procedure #1, " Motorola presentation to TR45.5.4 working group, TIA, pp. 2–8, (Feb. 17–25, 1998).

TR45.5.4 Working Group, "cdma2000 ITU–R RTT Candidate Submission," presented to TR–45.5 subcom. of Technical Industry Association (TIA), 209 pp. (Apr. 2, 1998).

TIA/EIA/IS–2000–5, "Extended Supplemental Channel Assignment Message," paragraph 3.7.3.3.2.37, 36 pp. (Aug. 1999).

Telecommunications Industry Association, (TIA) "Supplemental Channel Assignment Message," TIA/EIA–05–B, 80 pp. (Mar. 1999).

Alfred Baier, "Open Multi–Rate Radio Interface Architecture Based on CDMA," 2nd International Conf on Universal Personal Communications, pp. 985–989, (Oct. 12–15, 1993).

Alfred Baier et al., "Design Study for a CDMA–Based Third–Generation Mobile Radio Systems," IEEE Journal on Selected Areas in Communication, vol. 12 (No. 4), pp. 733–743, (May 1994).

F. Adachi et al., "Tree structured Generationof Orthogonal Spreading Codes with Different Lengths for Forward Link if DS–Cdma Mobile Radio," IEEE Electronics Letters, vol. 33 (No. 1), pp. 27–28, (Jan. 1997).

F. Adachi et al., "Wideband multi–rate DS–CDMA for next generation mobile communications systems," Proceedings of Wireless Communication Conference, pp. 57–62, (Aug. 11–13, 1997).

'TIA/EIA–95–A, "Forward Traffic Channel," paragraph 6.4.4, 28 pp. (1995).

* cited by examiner

DATA TRANSMISSION METHOD AND MOBILE TELEPHONE SYSTEM

FIELD OF THE INVENTION

The invention relates to a method for transmitting data from a radio network subsystem to user equipment in a mobile telephone system. The invention relates in particular to changing the data transmission rate of a traffic channel, especially a packet traffic channel during a radio link in a universal mobile telephone system.

BACKGROUND OF THE INVENTION

One of the biggest problems in mobile telephone systems is an efficient use of a limited radio capacity. In present systems, a certain amount of capacity is reserved for each user for a circuit-switched call during the entire radio link. When using packet-switched transmission, in which the data to be transmitted is typically generated in bursts, it is a waste of radio capacity to keep the radio capacity reserved all the time according to the greatest momentary data transmission need.

In systems using the code division multiple access (CDMA) method, in a downlink from a radio network subsystem to user equipment, different users use the same code tree in which the spreading codes used in the system are arranged mutually orthogonally. If a spreading code having a small spreading factor allowing a high transmission rate is reserved for one user, the code in question can reserve a large part of the capacity of the radio network subsystem in question, or its base transceiver station. In a code tree used by one base transceiver station, one sector of the base transceiver station can use sixteen mutually orthogonal sixteen character-long spreading codes, for instance, in which case the entire capacity of the base transceiver station can at one moment be in use and a new user will not have access to any data transmission resources for a downlink.

On an uplink, this problem does not exist, since each user has access to the entire code tree of the base transceiver station. Various users are distinguished from each other with a scrambling code which is specific for each transmitter. For instance, a universal mobile telecommunication system (UMTS) using a direct-sequence wideband code division multiple access method (DS W-CDMA) can have 512 different scrambling codes and 256 different spreading codes on a downlink. On an uplink, the number of scrambling codes can be much higher, even millions of different codes. It is interesting to note that a base transceiver station normally uses only one scrambling code for each transmitter.

In present mobile telephone systems, the data transmission rates used for both speech and data have been relatively low, and it has been possible to keep the resource problem under control. In new mobile telephone systems, the data transmission rates used will be considerably higher than in the present systems due to the wireless remote, use of various computer applications. The computer applications include various database applications, e-mail, WWW browser, etc.

For instance, the CDMA2000 system discloses a solution in which fundamental channels and supplementary channels are used. The fundamental channel transmits the signalling of the MAC (Medium Access Control) sub-layer of the data link layer, which indicates whether a supplementary channel with a higher transmission rate is used in addition to the fundamental channel. A problem with this solution is that it does not support fast changing of the channel transmission rate by changing the spreading code, since MAC sublayer signalling is used to change the spreading code and it is a relatively slow process.

BRIEF DESCRIPTION OF THE INVENTION

It is thus an object of the invention to develop a method and an apparatus implementing the method so as to solve the above problems. This is achieved by the method described in the following. The method in question is a method for transmitting data from a radio network subsystem to user equipment in a mobile telephone system, comprising: the radio network subsystem transmits a dedicated control channel to the user equipment; the radio network subsystem transmits a dedicated traffic channel of variable data transmission rate to the user equipment; during transmission, the radio network subsystem spreads each channel with a spreading code; the spreading code used to spread the traffic channel is changed according to the required data transmission rate. In the method in question, each frame of the control channel indicates the spreading code with which the corresponding traffic channel frame is spread when transmitted.

The invention also relates to a radio network subsystem which is adapted to: transmit a dedicated control channel to the user equipment; transmit a dedicated traffic channel of variable data transmission rate to the user equipment; spread each channel with a spreading code during transmission; change the spreading code used to spread the traffic channel according to the required data transmission rate. The radio network subsystem is adapted to indicate in each control channel frame the spreading code with which the corresponding traffic channel frame is spread when transmitted.

The invention further relates to user equipment which is adapted to: receive a dedicated control channel transmitted by the radio network subsystem; receive a dedicated traffic channel of variable data transmission rate transmitted by the radio network subsystem; remove the spreading of each channel with a spreading code. The user equipment is adapted to read from each control channel frame the spreading code with which the corresponding traffic channel frame is spread.

Preferred embodiments of the invention are disclosed in the dependent claims.

The invention is based on indicating in each control channel frame the spreading code with which the corresponding traffic channel is spread.

The method and system of the invention provide several advantages. The data transmission rate can quickly be changed, even by each frame, by selecting a suitable spreading code. This enables an efficient utilization of radio resources.

BRIEF DESCRIPTION OF THE DRAWINGS

In the following, the invention will be described in greater detail in connection with preferred embodiments with reference to the attached drawings in which.

DETAILED DESCRIPTION OF THE INVENTION

The invention can be used in various mobile telephone systems that use the code division multiple access method (CDMA). The examples illustrate the use of the invention in a universal mobile telephone system using a direct-sequence wideband code division multiple access method, without limiting the invention to it, however. The examples are based on the specification of the WCDMA system, further information on which is available in the ETSI (European Telecommunications Standards Institute) specification "The ETSI UMTS Terrestrial Radio Access (UTRA) ITU-R RTT Candidate Submission (Tdoc SMG2 260/98, May/June 1998), which is incorporated herein by reference.

The structure of a universal mobile telephone system is described with reference to FIGS. 1A and 1B. FIG. 1B includes only the blocks that are essential for describing the invention, but it is obvious to those skilled in the art that a common mobile telephone system also contains other functions and structures which need not be described in detail herein. The main parts of a mobile telephone system are a core network CN, a universal mobile telephone system (UMTS) terrestrial radio access network UTRAN, and user equipment UE. The interface between CN and UTRAN is referred to as Iu and the air interface between UTRAN and UE is referred to as Uu.

UTRAN comprises radio network subsystems RNS. The interface between RNSs is referred to as Iur. An RNS comprises a radio network controller RNC and one or more nodes B. The interface between RNC and B is referred to as Iub. The service area of node B, i.e. cell, is indicated with C in FIG. 1B.

Figure 1A:
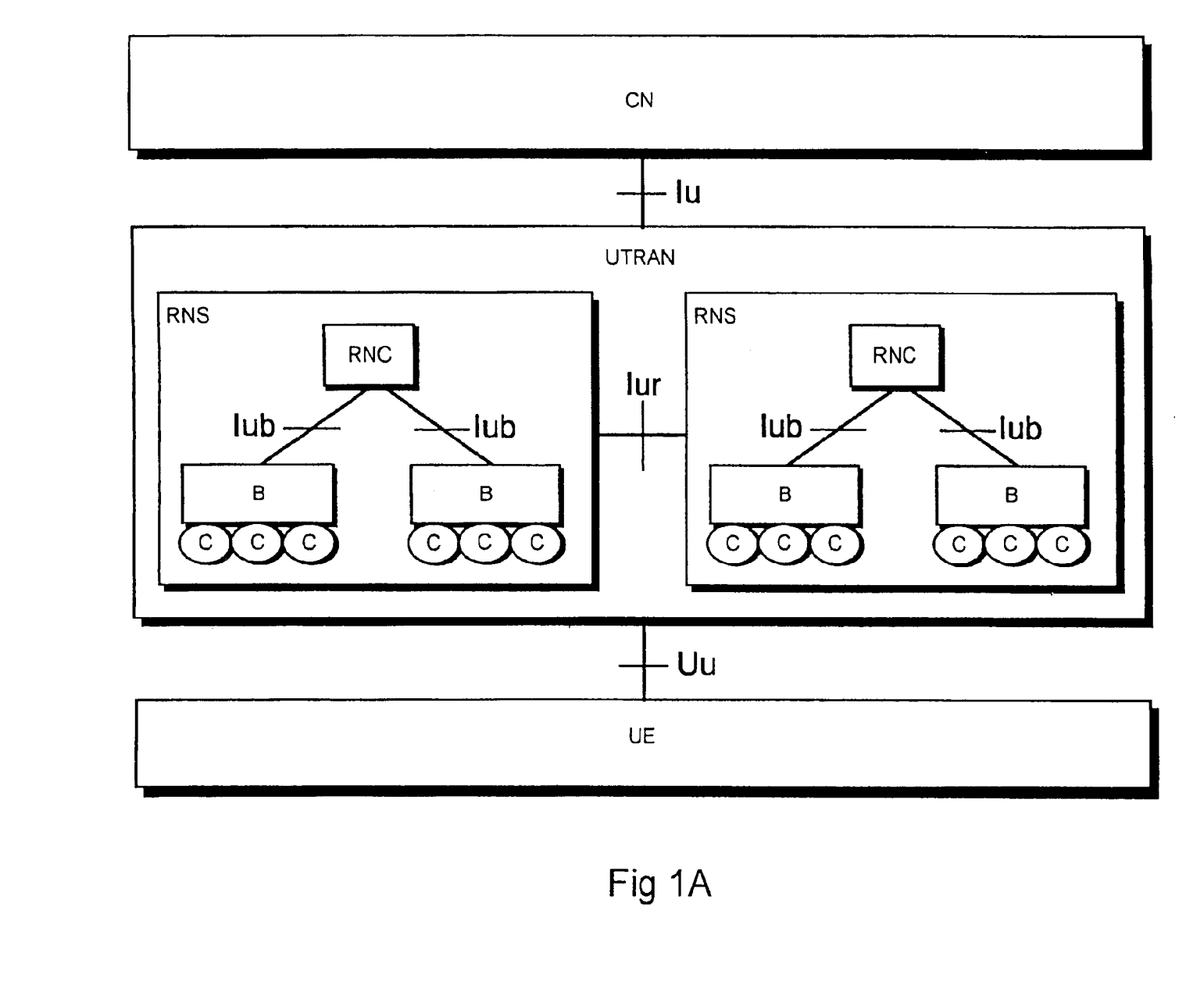
FIGS. 1A and 1B show a mobile telephone system.
Figure 1B:
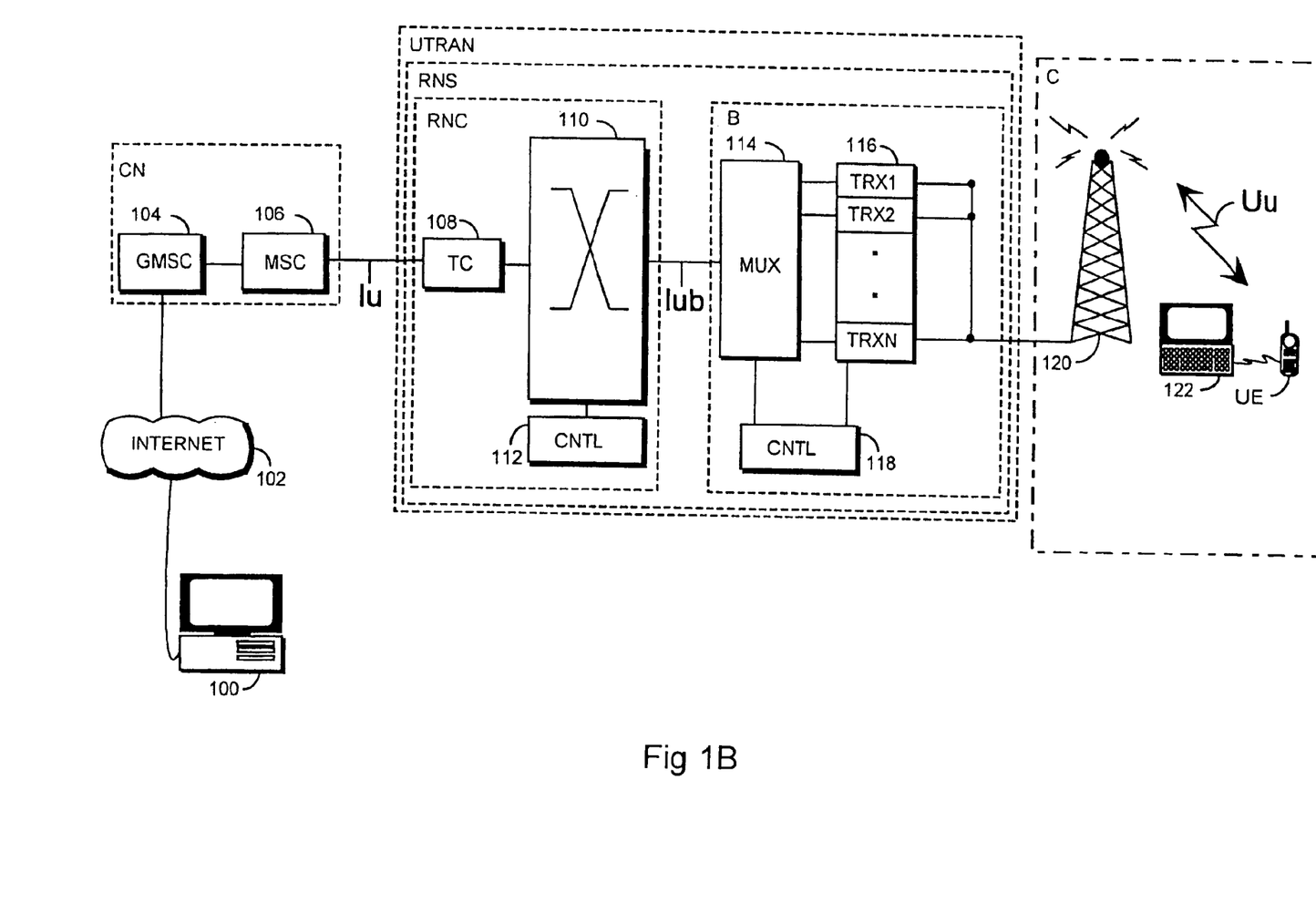

As the presentation in FIG. 1A is very abstract, it is therefore clarified in FIG. 1B by setting forth the parts of the GSM system that approximately correspond to the parts of the UMTS. It should be noted that the mapping shown is by no means a binding one but an approximation, since the responsibilities and functions of the different parts of the UMTS are still being planned.

FIG. 1B shows a packet transfer through the Internet 102 from a computer 100 connected to a mobile telephone system to a portable computer 122 connected to user equipment UE. The user equipment UE can, for instance, be a fixed terminal, a terminal arranged in a vehicle, or a portable terminal. The infrastructure of a radio network UTRAN comprises radio network subsystems RNS, i.e. base transceiver station systems. A radio network subsystem RNS comprises a radio network controller RNC, i.e. base station controller, and at least one node B, i.e. base transceiver station, under its control.

The base transceiver station B has a multiplexer 114, transceivers 116 and a control unit 118 which controls the operation of the transceivers 116 and the multiplexer 114. With the multiplexer 114, the traffic and control channels used by several transceivers 116 are placed in the transmission link Iub.

The transceiver 116 of the base transceiver station B are connected to an antenna unit 120 with which a bidirectional radio link Uu is implemented to user equipment UE. The structure of the frames to be transmitted over the bi-directional radio link Uu is clearly specified.

The radio network controller RNC comprises a group switching field 110 and control unit 112. The group switching field 110 is used for speech and data connection and to connect signalling circuits. The base station system formed by the base transceiver station B and the radio network controller RNC also comprises a transcoder 108. Work distribution between the radio network controller RNC and the base transceiver station B as well as their physical structure can vary depending on implementation. Typically, the base transceiver station B takes care of the radio path implementaton as described above. The radio network controller RNC typically takes care of the following: management of radio resources, control of handover between cells, power adjustment, timing and synchronization, paging the user equipment.

The transcoder 108 is usually located as close as possible to a mobile switching centre 106, because speech can then be transmitted in mobile telephone system format between the transcoder 108 and the radio network controller RNC saving transmission capacity. The transcoder 108 converts the different digital coding formats of speech used between the public switched telephone network and the mobile telephone network to be compatible with each other, for instance from the 64 kbits format of a public network to another (e.g. 13 kbit/s) format of a cellular network and vice versa. The hardware required is not described in detail herein, but it can be noted that other data than speech is not converted in transcoder 122. The control unit 112 takes care of call control, mobility management, collection of statistics, and signalling.

Core network CN comprises an infrastructure belonging to a mobile telephone system and external to UTRAN. FIG. 1B describes two of the components in a core network CN, i.e. a mobile switching centre 106 and a gateway mobile switching centre 104 which handles the connections of the mobile telephone system to the outside world, in this case, to the Internet 102.

Figure 5:
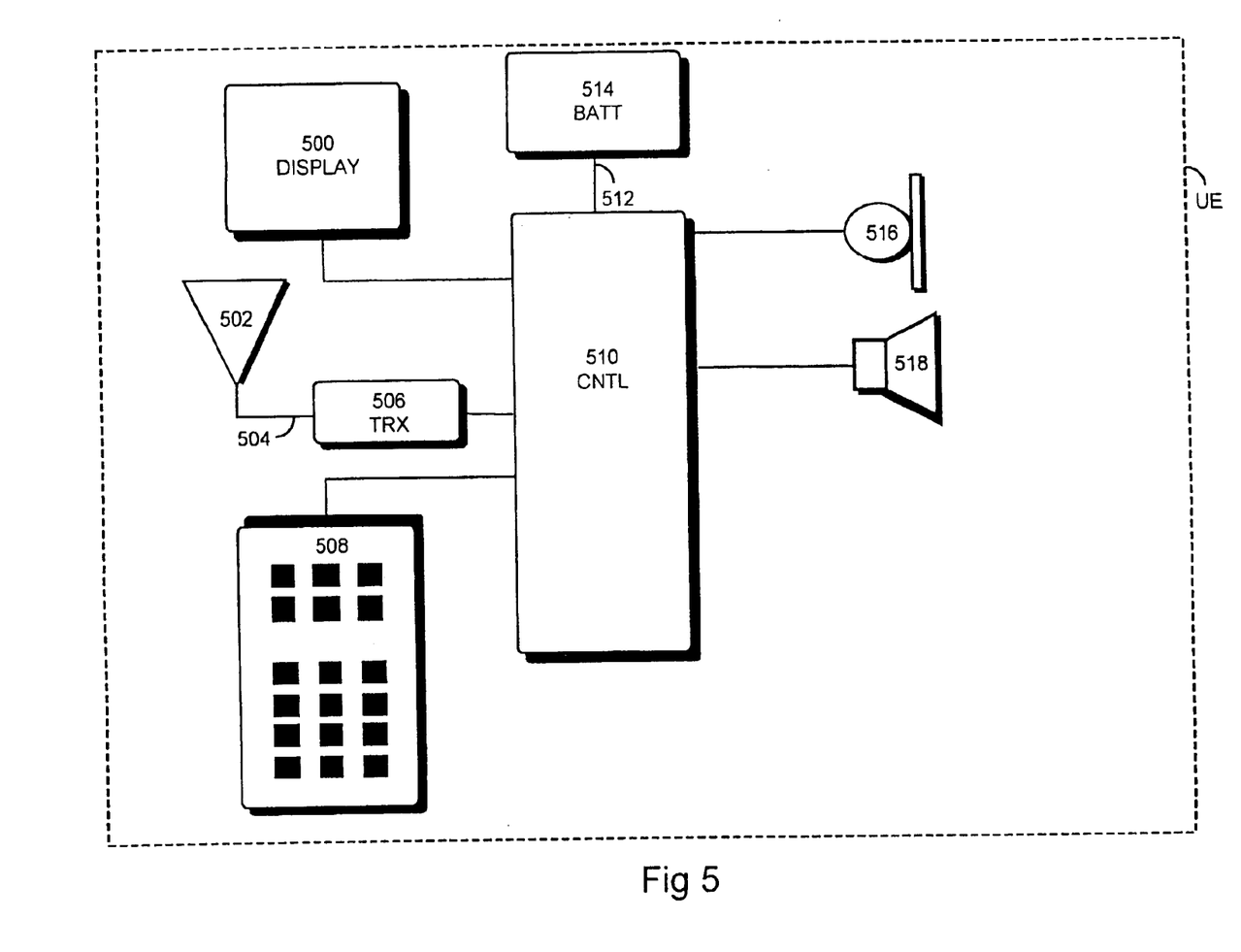
FIG. 5 shows user equipment.

FIG. 5 shows an example of the structure of user equipment UE. The essential parts of the user equipment UE are: an interface 504 to the antenna 502 of the user equipment, a transceiver 506, a control part 510 of the user equipment, and an interface 512 to a battery 514. The user interface usually comprises a display 500, a keyboard 508, a microphone 516, and a loudspeaker 518.

Figure 2A:
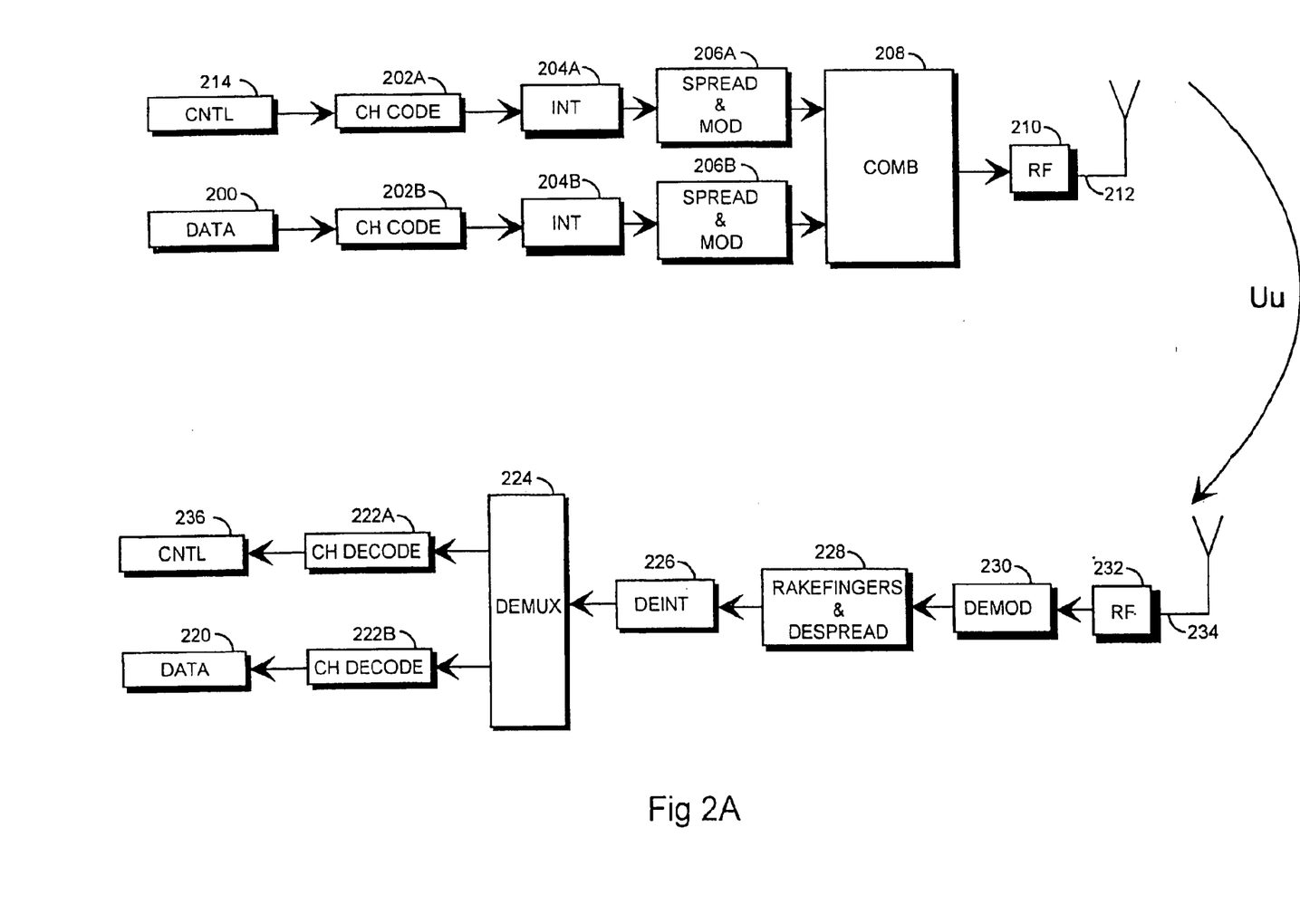
FIG. 2A shows a transmitter and receiver of the mobile telephone system.

FIG. 2A describes the operation of a radio transmitter—radio receiver pair. FIG. 2A describes a case of downlink where the radio transmitter is located in node B and the radio receiver in the user equipment UE.

The upper part of FIG. 2A describes the essential functions of the radio transmitter. Various services located in the physical channel include speech, data, moving or still video picture, and control channels of the system which are processed in the control part 214 of the radio transmitter. The figure shows the processing of the control channel and data. Different services require different source coding means, for instance speech requires a speech codec. For clarity's sake, source coding means are not, however, described in FIG. 2A.

Different channel coding is then performed for different channels in blocks 202A and 202B. Channel coding includes, for instance, different block codes, an example of which is cyclic redundancy check (CRC). In addition, convolution coding and its various modifications, such as punctured convolution coding or turbo coding, are typically used.

When the different channels have been channel-coded, they are interleaved in an interleaver 204A, 204B. The purpose of interleaving is to facilitate error correction. In interleaving, the bits of different services are mixed in a certain manner together, in which case a momentary fade in the radio path does not necessarily make the transmitted information unidentifiable. The interleaved bits are then spread with a spreading code, scrambled with a scrambling code and modulated in block 206A, 206B, the operation of which is described in greater detail in FIG. 2B. Individual signals are combined in block 208 to be transmitted through one transmitter.

Finally, the combined signal is forwarded to radio frequency parts 210 which can comprise different power amplifiers and filters restricting bandwidth. The analogous radio signal is then transmitted through an antenna 212 to the radio path Uu.

The lower part of FIG. 2A describes the essential functions of the radio receiver. The radio receiver is typically a RAKE receiver. An analogous radio frequency signal is received from the radio path Uu with an antenna 234. The signal is forwarded to radio frequency parts 232 comprising a filter which prevents all frequencies outside the desired bandwidth. After this, the signal is converted in a demodulator 230 to an intermediate frequency or directly to a base band, and the thus converted signal is then sampled and quantized.

As the signal in question is a multi-path propagated signal, the aim is to combine the signal components that propagated via different paths in block 228 which comprises several RAKE fingers of prior art. The signal components received at different time delays by the RAKE fingers are searched for by correlating the received signal with the spreading codes used and delayed by predefined time delays. When the time delays of the signal components have been found, the signal components belonging to the same signal are combined. At the same time, the spreading of the signal components is removed by multiplying the signal by the spreading code of the physical channel. The interleaving of the received physical channel is then removed in deinterleaving means 226.

The deinterleaved physical channel is then distributed to the data streams of various channels in a demultiplexer 224. The channels are directed each to its own channel decoding block 222A, 222B where the channel coding, for instance block coding or convolution coding, used in transmission is decoded. Convolution coding is preferably decoded with a Viterbi decoder. Each transmitted channel 220A, 220B can then be forwarded to a required further processing, for instance data 220 is forwarded to a computer 122 connected to the user equipment UE. The control channels of the system are forwarded to the control part 236 of the radio receiver.

Figure 2B:
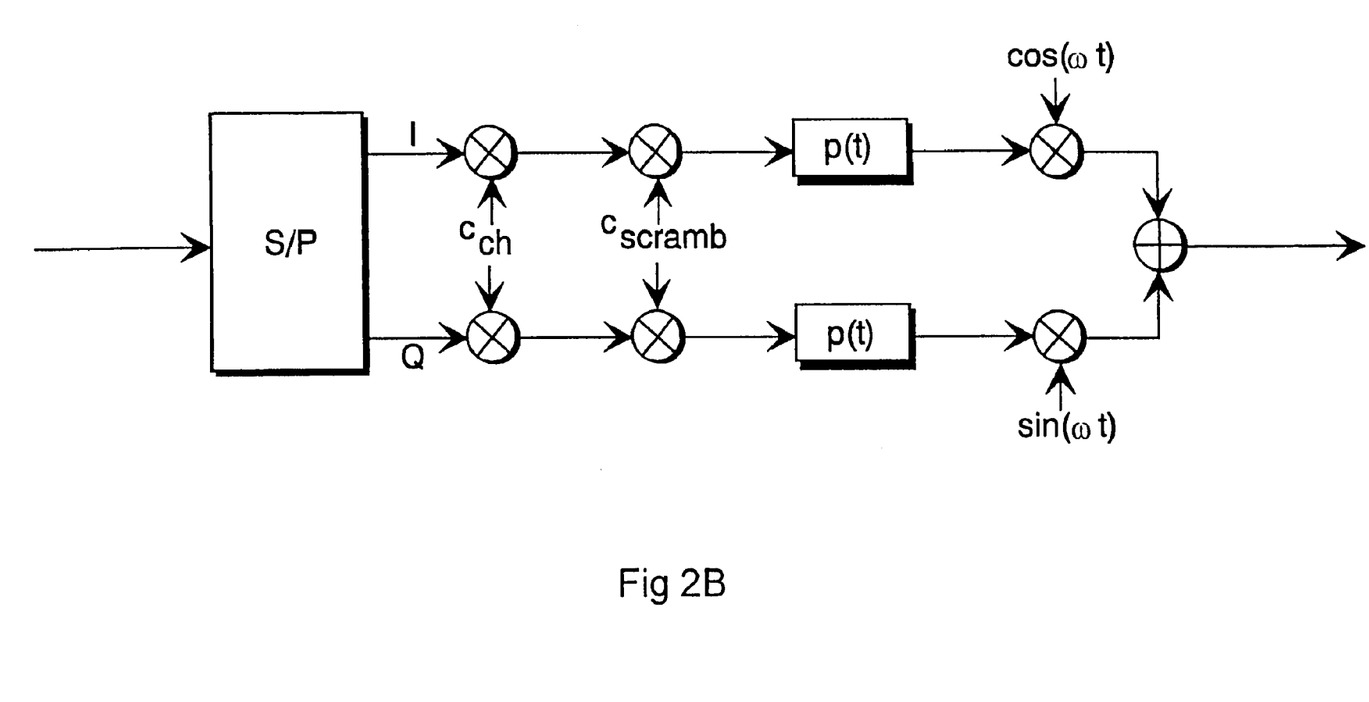
FIG. 2B shows spreading and modulation performed in the transmitter.

FIG. 2B describes in greater detail the spreading of a channel with a spreading code and its modulation. In the figure, the bit stream of the channel arrives from the left to block S/P in which each two-bit sequence is converted from serial mode to parallel mode, i.e. one bit is forwarded to the I branch of the signal and the second bit to the Q branch. Then the I and Q branches of the signal are multiplied by the same spreading code $C_{ch}$, in which case the relatively narrow-band information is spread on a wide frequency band. Each link Uu has its own spreading code by which the receiver identifies transmissions meant for it. The signal is then scrambled by multiplying it by a scrambling code $C_{scramb}$ which is different for each transmitter. The pulse format of the obtained signal is filtered with a filter p(t). Finally, the signal is modulated to a radio frequency carrier by multiplying its different branches offset by 90 degrees from each other, the thus obtained branches are combined into one carrier which is ready to be transmitted to the radio path Uu apart from possible filtering and power amplifications. The described modulation method is QPSK (Quadrature Phase Shift Keying).

Figure 4A:
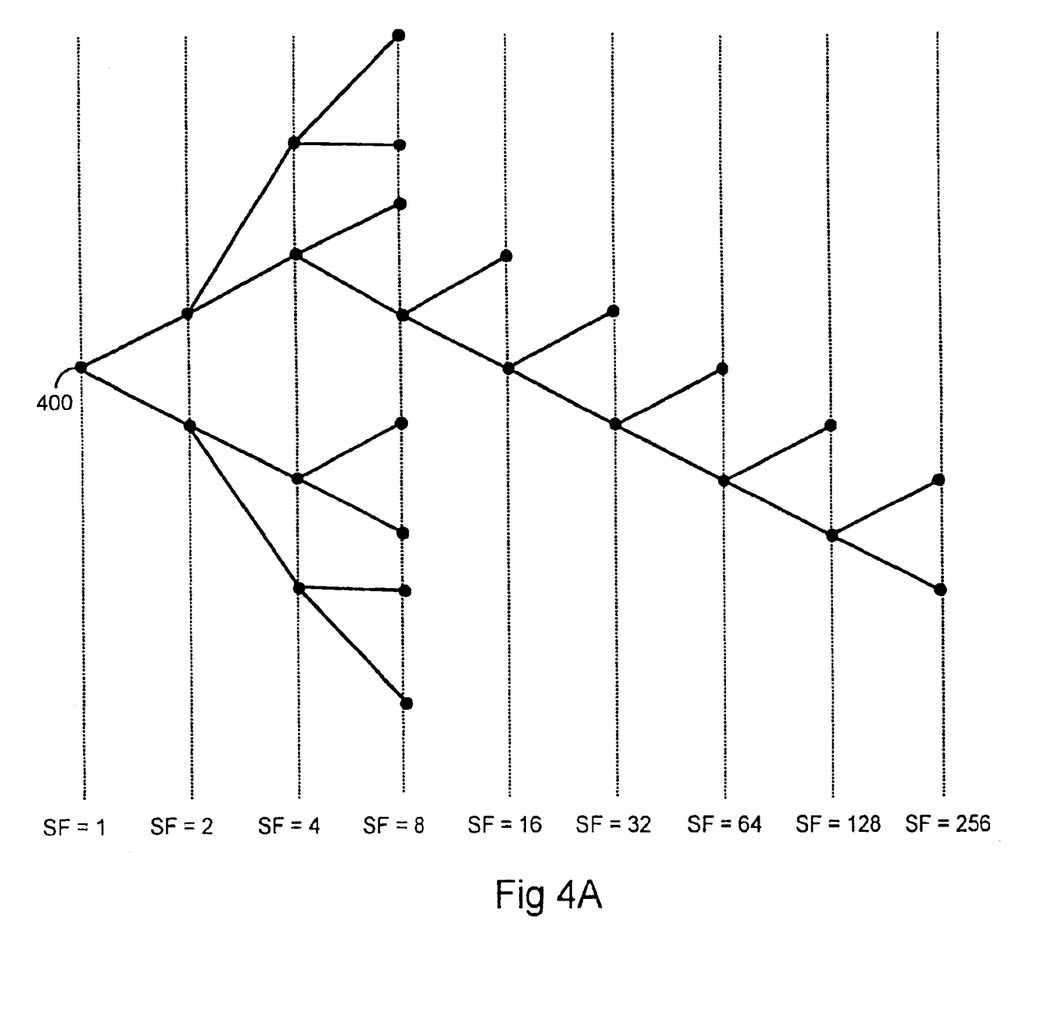
FIG. 4A shows a code tree.

FIG. 4A describes different spreading codes. Each point 400 represents one possible spreading code. The vertical dashed lines illustrate different spreading factors SF=1, SF=2, SF=4, SF=8, SF=16, SF=32, SF=64, SF=128, SF=256. The codes on each vertical dashed line are mutually orthogonal. It is thus possible to simultaneously use at most two hundred and fifty six different mutually orthogonal spreading codes. For instance in UMTS, when using a 4.096-megachip carrier, a spreading factor of SF=256 corresponds to a transmission rate of thirty two kilobits per second, and correspondingly the highest practical transmission rate is achieved with spreading factor SF=4, with which the data transmission rate is two thousand forty eight kilobits per second. The transmission rate in the channel varies thus step by step, 32, 64, 128, 256, 512, 1024, and 2048 kbit/s, while the spreading factor changes correspondingly, 256, 128, 64, 32, 16, 8, and 4. The data transmission rate available to the user depends on the channel coding used. For instance, when using 1/3 convolution coding, the data transmission rate of the user is approximately one third of the data transmission rate of the channel. The spreading factor indicates the length of the spreading code. For instance, the spreading code corresponding to spreading factor SF=1 is (1). Spreading factor SF=2 has two mutually orthogonal spreading codes (1,1) and (1,−1). Further, spreading code SF=4 has four mutually orthogonal spreading codes: under the higher-level spreading code (1,1), there are spreading codes (1,1,1,1) and (1,1,−1,−1), and under the second higher-level spreading code (1,−1), there are spreading codes (1,−1,1,−1) and (1,−1,−1,1). The formation of spreading codes is thus continued towards the lower levels of the code tree. The spreading codes of a certain level are always mutually orthogonal. Similarly, a spreading code of a certain level is orthogonal with all lower-level spreading codes derived from another spreading code on the same level.

Figure 3:
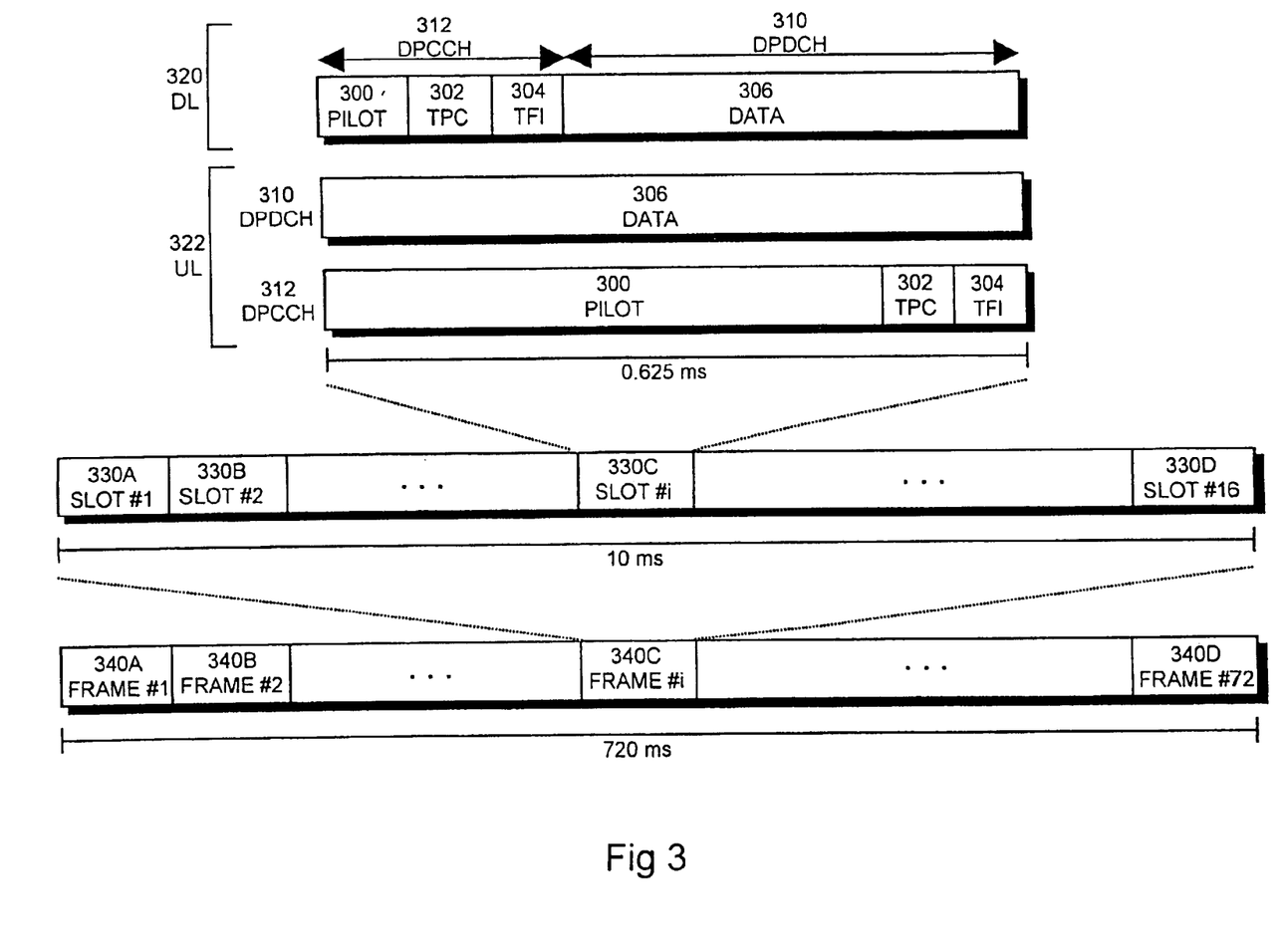
FIG. 3 shows channels of the mobile telephone system in a frame.

With reference to FIG. 3, an example will be described as to what kind of frame structure can be used in a physical channel. Frames 340A, 340B, 340C, 340D are numbered sequentially from one to seventy two and they form a 720-millisecond long super frame. The length of one frame 340C is 10 milliseconds. Frame 340C is divided into sixteen slots 330A, 330B, 330C, 330D. The length of one slot 330C is 0.625 milliseconds. One slot 330C typically corresponds to one power adjustment period during which power is adjusted one decibel up or down, for instance.

Physical channels are divided into two different types: dedicated physical data channels (DPDCH) 310 and dedicated physical control channels (DPCCH) 312. Dedicated physical data channels 310 are used to transmit data 306 which is generated on the second layer and above of OSI (Open Systems Interconnection), i.e. the dedicated control channels and dedicated traffic channels. Dedicated physical control channels 312 transmit control information generated on the first layer of OSI. Control information comprises: pilot bits 300 used in channel estimation, transmit power control commands (TPC) 302, and optionally a transport format indicator (TFI) 304. The transport format indicator 304 indicates to the receiver the transmission rate used for each dedicated physical data channel of the uplink at a given time.

As shown in FIG. 3, the dedicated physical data channels 310 and the dedicated physical control channels 312 on the downlink are time-multiplexed to the same slot 330C. However, on the uplink, the channels in question are transmitted parallel so that they are IQ/code-multiplexed (I=in-phase, Q=quadrature) to each frame 340C and transmitted using dual-channel QPSK modulation (dual-channel quadrature phase-shift keying modulation). When additional dedicated physical data channels 310 need to be transmitted, they are code-multiplexed to the I or Q branch of the first channel pair.

Figure 6:
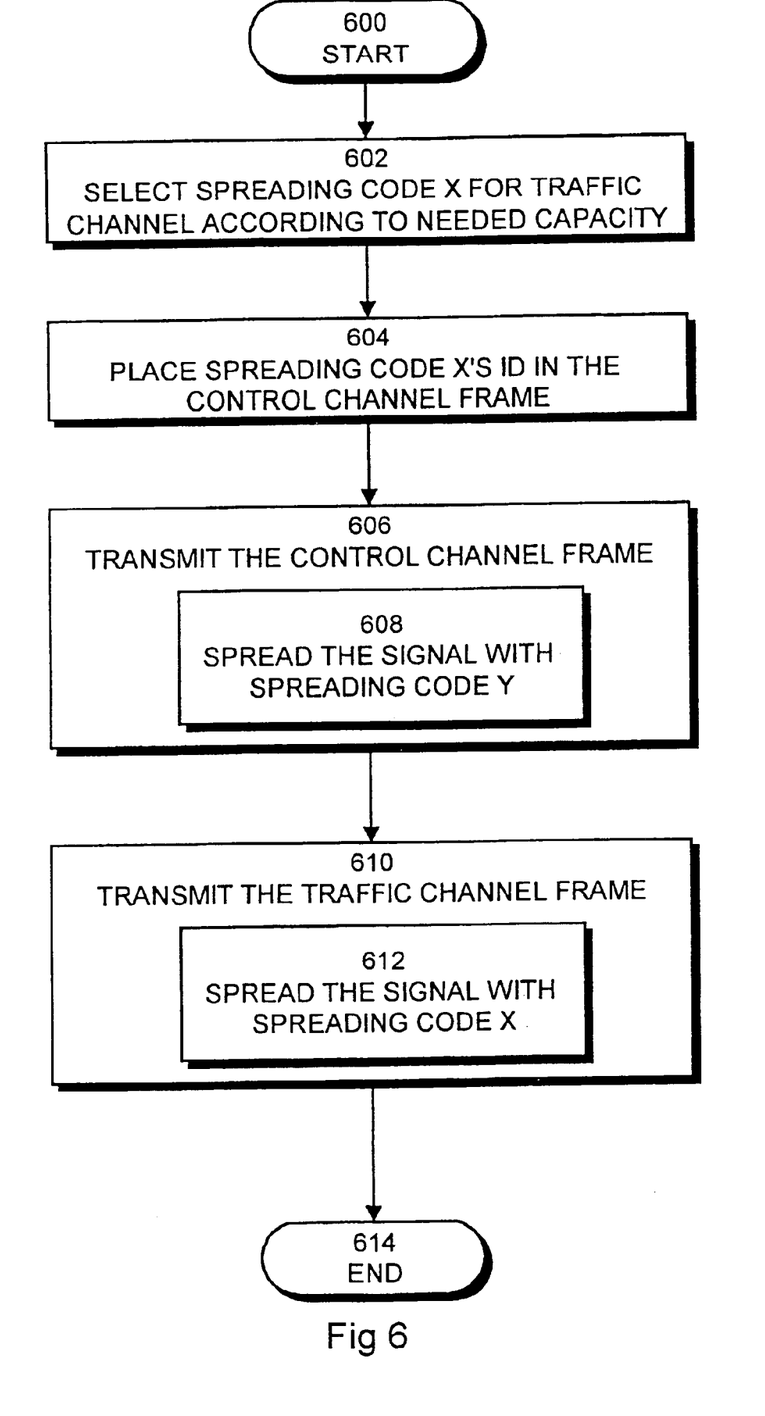
FIG. 6 shows a flow chart of the operations of the invention.

The method of the invention for transmitting data from a radio network subsystem RNS to user equipment UE can be illustrated by the flow chart in FIG. 6. The execution of the method for a single radio frame is started from block 600.

Next, in block 602, the spreading code used in spreading the traffic channel is changed according to the required data transmission rate. The spreading code selected for the traffic channel is marked X.

Next, in block 604, each control channel frame indicates the spreading code with which the corresponding traffic channel frame is spread when transmitted. In other words, the identification data of the spreading code X are entered in the control channel frame.

In block 606, the radio network subsystem RNS transmits a dedicated control channel frame to the user equipment UE. During transmission, the operation in block 608, for instance, is performed, in which the radio network subsystem RNS spreads each channel with a spreading code. The spreading code selected here for the control channel is marked Y.

In block 610, the radio network subsystem RNS transmits a dedicated traffic channel of variable data transmission rate to the user equipment UE. The variable data transmission rate is achieved by changing the spreading code; as described in connection with FIG. 4A, each spreading factor has a different data transmission rate. During transmission, the operation in block 612 for instance, is performed, in which the radio network subsystem RNS spreads each channel with a spreading code, i.e. the traffic channel is spread with the selected spreading code X.

Thus, in the invention, the transmitter transmits the traffic channel frame spread with the spreading code X. The transmitter transmits the control channel frame associated with the traffic channel in question spread with the spreading code Y. The control channel frame indicates that the corresponding traffic channel frame has been spread with the spreading code X. This way, the receiver can remove the spreading of the traffic channel frame in question. Thus, the receiver need not know in advance what the data transmission capacity/spreading code of the traffic channel frame in question is.

The association of the control channel frame and the traffic channel frame with each other must be indicated in some way. The easiest way to do this is to combine the association with timing, for instance so that the frames are transmitted at approximately the same time. The control channel frames and traffic channel frames associated with each other are preferably transmitted on the same frequency, spread with different spreading codes, and substantially simultaneously, i.e. separated by one frame length at most.

In a preferred embodiment of the invention, the identification data of the spreading code X used to spread the traffic channel is entered into the transport format indicator in the control channel frame. This provides the advantage that new fields need not be defined for this function.

A part of the code tree shown in FIG. 4A must be reserved for the use of the control channels. The spreading factor can also be increased to 1024, for instance, by extending the code tree to lower levels, whereby an adequate data transmission rate of eight kilobits per seconds could be achieved.

Figure 4B:
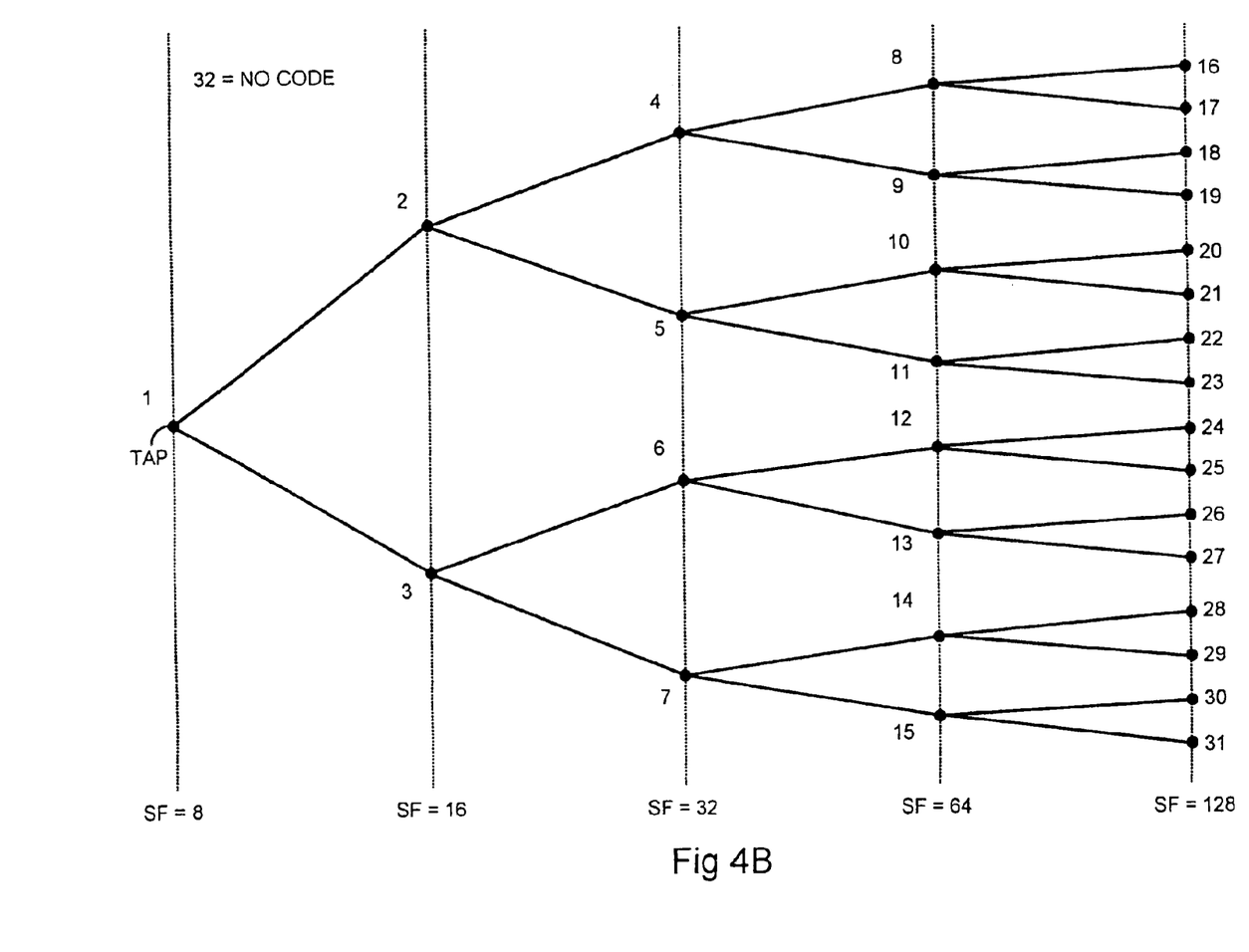
FIG. 4B shows a subcode tree.

FIG. 4B shows one preferred embodiment in which the code tree is divided into sub-code trees, and one branch in a level is a tree access point to the sub-code tree in question, and the branches below the tree access point belong to the sub-code tree in question. In FIG. 4B, one of the eight spreading codes of the spreading factor SF=8 has been chosen as the tree access point TAP of the sub-code tree. The size of the sub-code tree has also been restricted so that the spreading codes of the spreading factor SF=256 are not meant to be Used, since their data transmission rate 32 kbit/s is relatively low. Data transmission rates of 64 kbit/s, 128 kbit/s, 256 kbit/s, 512 kbit/s, and 1024 kbit/s can thus be achieved with the selected sub-code tree. The presented sub-code tree is only one example of several possible sub-code trees, the specification of sub-code trees in the system depends on the properties required in the system, such as traffic volume. The data transmission rate of the traffic channel is changed by changing the length of its spreading code, i.e. by moving between the levels of the sub-code tree.

In one preferred embodiment, each spreading code of a sub-code tree is numbered in an agreed manner, and the number in question is entered into the transport format indicator. In the example of FIG. 4B, the spreading codes are numbered from 1 to 32. The numbers 1 to 31 each identify one spreading code and the number 32 indicates that no spreading code is used in the frame in question, i.e. the capacity of the frame in question can be freely utilized by another link with certain restrictions.

The restrictions are due to the fact that the spreading codes used at each instant must be mutually orthogonal. A spreading code can be used only if no other code on the path to the tree access point TAP of the sub-tree is being used and none of the spreading codes on the paths on the levels below the spreading code in question are being used. For instance, if the spreading code 4 is being used, the spreading codes 8, 9, 16, 17, 18, and 19 on the levels below it cannot be used. Instead, the spreading codes 5, 6, 7, and all spreading codes on levels below them, i.e. 10 to 15 and 20 to 31, can be used. If spreading code 1 is being used, none of the spreading codes 2 to 31 of the subcode tree can be used.

The numbering of the spreading codes in a sub-code tree can also be implemented in such a way that one number corresponds to two or more parallel spreading codes. This way, using multi-code reception in the receiver, the use of too small spreading ratios can be avoided, for instance in unfavorable propagation conditions of radio waves or due to the restrictions of the receiver in the user equipment. When higher transmission rates are needed, the numbering of the subcode tree can be begun from the lower spreading code levels.

A typical situation could be that the system has several users of a 64 kbit/s link, which means that the spreading codes 16 to 27, for instance, are being used. In such a case, the spreading codes 1 to 6 and 8 to 13 can, of course, not be used. Instead, the spreading codes 7, 14, 15, and 28 to 31 are available for use. The system can thus, in addition to the above users, have one user, for instance, who uses the spreading code 7 and, with it, the transmission rate 256 kbit/s.

According to the rules described above, it is thus possible to select from the same sub-code tree a spreading code for one or more units of user equipment. The radio network subsystem allocates the spreading codes. When the sub-code tree becomes congested, the user equipment can be transferred to another sub-code tree. The described method is good as regards data security, too, because it does not matter, if a receiver, to which a frame does not belong, were to detect the frame by accident, since the protection used on the higher levels, for instance ciphering in a GSM system, makes sure that the data within the frame cannot be read. Alternatively, the matter can be taken care of by scrambling, as is done in the first layer of the CDMA2000 system.

Processing channels in the radio interface Uu is performed with a protocol architecture comprising a physical layer, data link layer and network layer of the ISO (International Standardisation Organisation) OSI (Open Systems Interconnection) model. The protocol stacks are located both in the radio network subsystem RNS and in the user equipment UE. The data link layer is divided into two sub-layers: the MAC (Medium Access Control) sublayer and the LAC (Link Access Control) sub-layer. Typically, the services provided by the physical layer for the higher layers determine the transmission channel and its properties, such as the spreading code used. The MAC sub-layer's task is to control access to the physical layer; the selection of the transport format indicator, for instance, is performed in this sub-layer. The signalling of the physical layer, data link layer and network layer is transmitted in the control channel.

The user equipment does not send an acknowledgement to the radio network subsystem after receiving the transport format indicator, but this signalling is performed as signalling of the physical layer without acknowledgement. In poor radio conditions, this may result in that the user equipment cannot read the spreading code with which the corresponding traffic channel frame was transmitted. In such a case, the protocols of the higher layers manage the re-transmission of the packet using the ARQ (Automatic Repeat Request) method.

The radio network subsystem signals the tree access point of the sub-code tree to the user equipment, and the user equipment sends an acknowledgement to the radio network subsystem. This signalling is preferably performed between the MAC sub-layers, because the tree access point of the sub-code tree is not changed very often, and it is necessary to make sure that, in case of failure in signalling, a relatively difficult re-signalling need not be performed.

In one preferred embodiment, the radio network subsystem transmits the traffic channel frames in a synchronized manner to the units of user equipment which belong to the same sub-code tree. This provides the advantage that the allocation of the sub-code tree between various links is easier, since the reservations of different codes are freed and the reservations of new codes are made always at certain instants, generally at one-frame intervals.

In the invention, the required data transmission rate of the control channel is preferably as low as possible, because the required signalling does not require a lot of data transmission capacity; one possible data transmission rate is eight kilobits per second.

In one preferred embodiment, the control channel contains pilot bits for channel estimation. This way, pilot bits are not necessarily needed in the traffic channel, i.e. the traffic channel contains only useful load of the user. Channel estimation can be done by means of the control channel pilot bits only, because the signal passes through the same channel, only the spreading code is different.

In one preferred embodiment, the radio network subsystem transmits the control channel frames of different user equipment as non-simultaneously as possible. This procedure facilitates channel estimation, because the pilot bits overlap as little as possible during different connections.

In one preferred embodiment, other than control data, for instance data or speech, is transmitted in the free capacity of the control channel frame. The data can even be circuit-switched link packets, because the control channel capacity is reserved during the entire link, during which the data transmission rate of the control channel is fixed.

The same spreading code is typically always used in spreading the control channel. Only during handover may the control channel spreading code need to be changed. The control channel spreading code in question is selected as described above either from the part of the code tree reserved for the use of the control channels or from a code space outside the code tree. However, the spreading codes must be mutually orthogonal, which is why, for clarity's sake, all system codes are usually formed by means of a code tree.

The invention is preferably implemented by means of software. The processing required in the radio network subsystem necessitates changes to the protocol processing software and to the control of transmitter operation. Correspondingly, in the user equipment, it is necessary to make changes to the protocol processing software and to the control of receiver operation.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for transmitting data from a radio network subsystem to user equipment in a mobile telephone system, comprising:

the radio network subsystem transmits a physical control channel to the user equipment;

the radio network subsystem transmits a physical traffic channel of variable data transmission rate to the user equipment;

during transmission, the radio network subsystem spreads each channel with a spreading code;

the spreading code used to spread the traffic channel is changed according to a required data transmission rate, and wherein each control channel frame indicates the spreading code with which a corresponding traffic channel frame is spread when transmitted, and wherein the control channel and traffic channel frames associated with each other are transmitted on the same frequency, spread with a different spreading code, and separated by one frame length at most.

2. A method as claimed in claim 1, wherein the control channel frame comprises a transport format indicator in which the spreading code used to spread the traffic channel is disclosed.

3. A method as claimed in claim 1, wherein the spreading codes are arranged into a code tree in such a manner that on the first level, the code tree root comprises a one-bit spreading code, the second level comprises two branches with mutually orthogonal two-bit spreading codes, the third level comprises four branches with mutually orthogonal four-bit spreading codes, the fourth level comprises eight branches with mutually orthogonal eight-bit spreading codes, the fifth level comprises sixteen branches with mutually orthogonal sixteen-bit spreading codes, the sixth level comprises thirty two branches with mutually orthogonal thirty-two-bit spreading codes, the seventh level comprises sixty four branches with mutually orthogonal sixty-four-bit spreading codes, the eighth level comprises one hundred and twenty eight branches with mutually orthogonal 128-bit spreading codes, the ninth level comprises two hundred and fifty six branches with mutually orthogonal 256-bit spreading codes.

4. A method as claimed in claim 3, wherein a part of the spreading codes of the code tree are reserved for the use of the control channels.

5. A method as claimed in claim 3, wherein the code tree is divided into sub-code trees and one branch in a level is a tree access point to a sub-code tree, and the branches below the tree access point belong to the sub-code tree in question.

6. A method as claimed in claim 5, wherein the data transmission rate of the traffic channel is changed by changing the length of its spreading code by moving between the levels of the sub-code tree.

7. A method as claimed in claim 6, wherein each spreading code of a sub-code tree is numbered in an agreed manner and the number in question is entered into a transport format indicator.

8. A method as claimed in claim 7, wherein the number refers to at least two parallel spreading codes.

9. A method as claimed in claim 6, wherein the user equipment does not send an acknowledgement to the radio network subsystem after receiving a transport format indicator.

10. A method as claimed in claim 5, wherein the radio network subsystem signals the tree access point of the sub-code tree to the user equipment and the user equipment sends an acknowledgement to the radio network subsystem.

11. A method as claimed in claim 10, wherein the signaling of the tree access point of the sub-code tree is performed as signaling of the MAC sub-layer in the data link layer.

12. A method as claimed in claim 5, wherein at least two different units of user equipment use the various spreading codes of the same sub-code tree.

13. A method as claimed in claim 12, wherein the radio network subsystem allocates the spreading codes.

14. A method as claimed in claim 13, wherein when the sub-code tree becomes congested, the user equipment can be transferred to another sub-code tree.

15. A method as claimed in claim 1, wherein signaling of the physical layer, data link layer and network layer are transmitted in the control channel.

16. A method as claimed in claim 1, wherein the radio network subsystem transmits the traffic channel frames in a synchronized manner to the units of user equipment which belong to the same sub-code tree.

17. A method as claimed in claim 1, wherein the data transmission rate of the control channel is as low as possible.

18. A method as claimed in claim 1, wherein the control channel contains pilot bits for channel estimation.

19. A method as claimed in claim 1, wherein the traffic channel contains only useful load of a user.

20. A method as claimed in claim 1, wherein the radio network subsystem transmits the control channel frames of different user equipment as non-simultaneously as possible.

21. A method as claimed in claim 1, wherein data or speech is transmitted in free capacity of the control channel frame.

22. A method as claimed in claim 1, wherein the same spreading code is always used in spreading the control channel.

23. A method as claimed in claim 1, wherein the data transmission rate of the control channel is fixed.

24. A method as claimed in claim 1, wherein the method is used in a universal mobile telecommunication system using a direct-sequence wideband code division multiple access method.

25. A radio network subsystem which is adapted to:
transmit a physical control channel to user equipment;
transmit a physical traffic channel of variable data transmission rate to the user equipment;
spread each channel with a spreading code during transmission; and
change the spreading code used to spread the traffic channel according to a required data transmission rate, wherein
the radio network subsystem is adapted to indicate in each control channel frame the spreading code with which a corresponding traffic channel frame is spread when transmitted, and
wherein the radio network subsystem is adapted to transmit the control channel and traffic channel frames associated with each other on the same frequency, spread with different spreading codes, and separated by one frame length at most.

26. A radio network subsystem as claimed in claim 25, wherein the control channel frame comprises a transport format indicator into which the radio network subsystem is adapted to enter the identification data of the spreading code used to spread the traffic channel.

27. A radio network subsystem as claimed in claim 25, wherein the spreading codes are arranged into a code tree in such a manner that on the first level, the code tree root comprises a one-bit spreading code, the second level comprises two branches with mutually orthogonal two-bit spreading codes, the third level comprises four branches with mutually orthogonal four-bit spreading codes, the fourth level comprises eight branches with mutually orthogonal eight-bit spreading codes, the fifth level comprises sixteen branches with mutually orthogonal sixteen-bit spreading codes, the sixth level comprises thirty two branches with mutually orthogonal thirty-two-bit spreading codes, the seventh level comprises sixty four branches with mutually orthogonal sixty-four-bit spreading codes, the eight level comprises one hundred and twenty eight branches with mutually orthogonal 128-bit spreading codes, the ninth level comprises two hundred and fifty six branches with mutually orthogonal 256-bit spreading codes.

28. A radio network subsystem as claimed in claim 27, wherein the radio network subsystem is adapted to reserve a part of the spreading codes in the code tree for the use of the control channels.

29. A radio network subsystem as claimed in claim 27, wherein the radio network subsystem is adapted to divide the code tree into sub-code trees, and one branch in a level is a tree access point to a sub-code tree, and the branches below the tree access point belong to the sub-code tree in question.

30. A radio network subsystem as claimed in claim 29, wherein the radio network subsystem is adapted to change the data transmission rate of the traffic channel by changing the length of its spreading code by moving between the levels of the sub-code tree.

31. A radio network subsystem as claimed in claim 30, wherein the radio network subsystem is adapted to number each spreading code of a sub-code tree in an agreed manner and to enter the number in question into a transport format indicator.

32. A radio network subsystem as claimed in claim 31, wherein the number refers to at least two parallel spreading codes.

33. A radio network subsystem as claimed in claim 30, wherein the radio network subsystem does not expect an acknowledgement from the user equipment after transmitting a transport format indicator to the user equipment.

34. A radio network subsystem as claimed in claim 29, wherein the radio network subsystem is adapted to signal the tree access point of the sub-code tree to the user equipment and to await an acknowledgement to its signaling from the user equipment.

35. A radio network subsystem as claimed in claim 34, wherein the radio network subsystem is adapted to perform the signaling of the tree access point of the sub-code tree as signaling of the MAC sub-layer in the data link layer.

36. A radio network subsystem as claimed in claim 29, wherein the radio network subsystem is adapted to use the various spreading codes of the same sub-code tree for at least two different units of user equipment.

37. A radio network subsystem as claimed in claim 36, wherein the radio network subsystem is adapted to allocate the spreading codes.

38. A radio network subsystem as claimed in claim 37, wherein when the sub-code tree becomes congested, the radio network subsystem is adapted to transfer the user equipment to another sub-code tree.

39. A radio network subsystem as claimed in claim 25, wherein the radio network subsystem is adapted to transmit signaling of the physical layer, data link layer and network layer in the control channel.

40. A radio network subsystem as claimed in claim 25, wherein the radio network subsystem is adapted to transmit the traffic channel frames in a synchronized manner to the units of user equipment which belong to the same sub-code tree.

41. A radio network subsystem as claimed in claim 25, wherein the radio network subsystem is adapted to set the data transmission rate of the control channel as low as possible.

42. A radio network subsystem as claimed in claim 25, wherein the radio network subsystem is adapted to place pilot bits into the traffic channel for channel estimation.

43. A radio network subsystem as claimed in claim 25, wherein the radio network subsystem is adapted to place only useful load in the traffic channel.

44. A radio network subsystem as claimed in claim 25, wherein the radio network subsystem is adapted to transmit the control channel frames of different user equipment as non-simultaneously as possible.

45. A radio network subsystem as claimed in claim 25, wherein the radio network subsystem is adapted to place data or speech in free capacity of the control channel frame.

46. A radio network subsystem as claimed in claim 25, wherein the radio network subsystem is adapted to always use the same spreading code in spreading the control channel.

47. A radio network subsystem as claimed in claim 25, wherein the radio network subsystem is adapted to transmit the control channel at a fixed data transmission rate.

48. A radio network subsystem as claimed in claim 25, wherein the radio network subsystem is a part of a universal mobile telecommunication system using a direct-sequence wideband code division multiple access method.

49. User equipment comprising:

a receiver which is adapted to receive a physical control channel transmitted by a radio network subsystem; and receive a physical traffic channel of variable data transmission rate transmitted by the radio network subsystem, wherein a spreading code used by the radio network subsystem to spread the traffic channel during transmission is changed according to a required data transmission rate; and a control part which is adapted to remove the spreading of each channel with a spreading code, wherein the user equipment is adapted to read from each control channel frame the spreading code with which a corresponding traffic channel frame is spread, and wherein the user equipment is adapted to receive the control channel frames and traffic channel frames associated with each other transmitted by the radio network subsystem on the same frequency, spread with different spreading codes, and separated by one frame length at most.

50. User equipment as claimed in claim 49, wherein the control channel frame comprises a transport format indicator from which the user equipment is adapted to read the identification data of at least one spreading code used to spread the traffic channel.

51. User equipment as claimed in claim 49, wherein the user equipment is adapted to perform channel estimation by means of the pilot bits in the control channel.

52. User equipment as claimed in claim 49, wherein the user equipment is adapted to always use the same spreading code in removing the control channel spreading.

53. User equipment as claimed in claim 49, wherein the user equipment is used in a universal mobile telecommunication system using a direct-sequence wideband code division multiple access method.

* * * * *